Figures 1, 2:
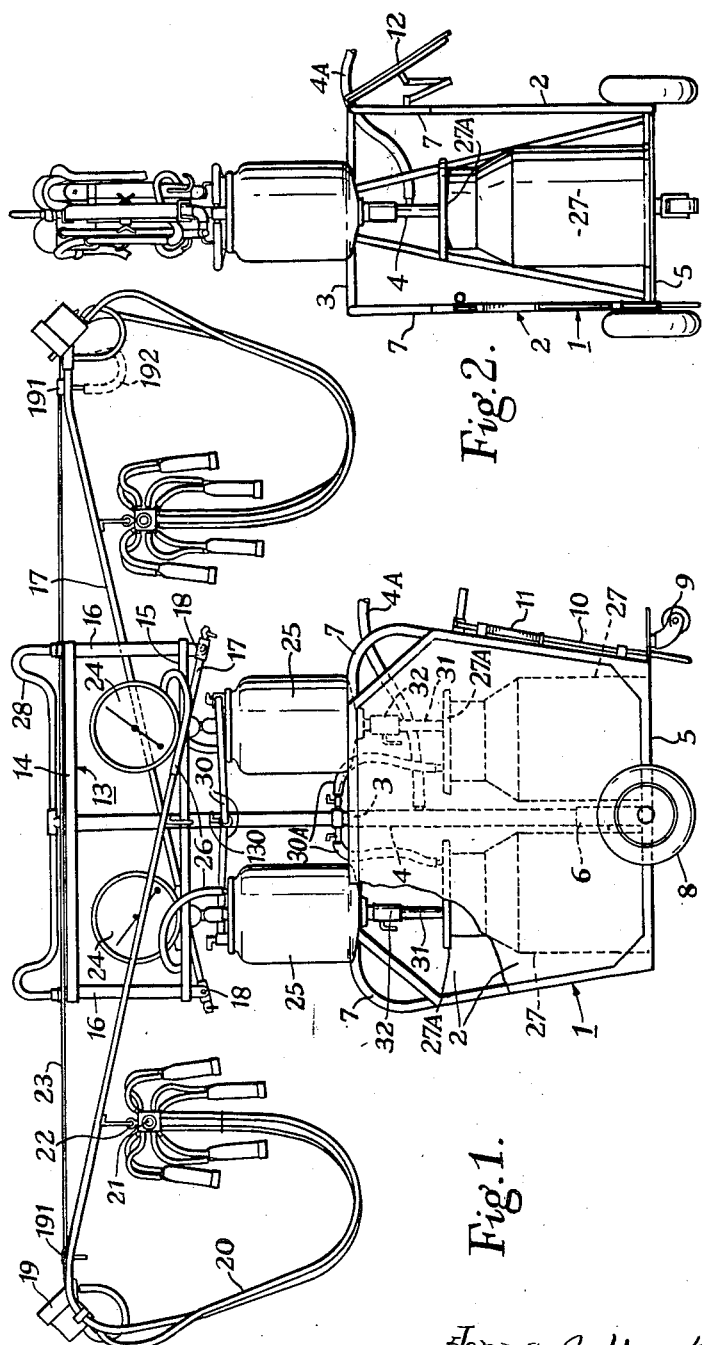

May 18, 1954  J. A. KINGSTON  2,678,627
MILKING MACHINE
Filed June 19, 1952

INVENTOR
Jonas Arthur Kingston
BY
Theoderoth, Lind + Ponack
ATTORNEYS

Patented May 18, 1954

2,678,627

UNITED STATES PATENT OFFICE 2,678,627

MILKING MACHINE

Jonas Arthur Kingston, Tilehurst, near Reading, England, assignor to Gascoignes (Reading) Ltd., Reading, England, a British company Application June 19, 1952, Serial No. 294,322

Claims priority, application Great Britain June 28, 1951

2 Claims. (Cl. 119—14.11)

This invention relates to milking machines. Portable milking machines are known in which a wheeled chassis supports vacuum-producing means and a main vacuum pipe in the form of a swinging arm, which latter carries a milk receiver, a teat cup cluster, a pulsator and the necessary tubes for interconnecting these components in such a manner that they could all be swung together in relation to the chassis of the machine.

The present invention is concerned with portable milking machines of the same general arrangement as described above, except that the vacuum-producing means need not be carried by these improved portable machines.

The main object of the present invention is to provide improved mobile milking machines suitable for transporting a small number of milk cans, provision being made for the yield from each cow to be weighed automatically and the rate of milking watched as the milking operation proceeds.

By way of example, an embodiment of the invention will now be described with reference to the accompanying drawings, wherein:

Figures 1 and 2 are a part-sectional side elevation and an end elevation respectively of a single post double-arm mobile milking machine.

In the construction of a portable milking machine illustrated there is provided a trolley 1 comprising a wheeled framework consisting of two side fences 2 braced by a transverse rigid stay 3 located midway of the framework. This transverse stay 3 serves to hold erect a tubular post 4 situated at the centre of a low-level platform 5, the lower end of the post 4 being received in a socket 6 upstanding from the platform 5. The two top corners of each of the side fences 1, 2 are fashioned to form handles 7 to facilitate pushing the trolley 1 along on a pair of ground wheels 8 mounted, for preference and as shown, in transverse alignment with the central post 4. Additional wheels or castors may be mounted under the platform 5 near the opposite ends thereof, one such castor 9 being shown. At one end, as shown or at both ends of the trolley 1 a rod 10 loaded by a spring 11 may be mounted for sliding movement in a substantially vertical direction so that the rod is urged toward contact with the ground and may be used to "brake" or "anchor" the trolley in a required position, any suitable catch arrangement being provided to hold the rod in an elevated position during transit. A hinged flap 12 strutable in a horizontal position for supporting a log book or the like is provided on one of the side fences 2.

The central post 4, which may be of telescopic form, carries on its upper part a rigid open frame 13 which is fixed to said post 4 to lie in a fore-and-aft plane, coincident with the longitudinal axis of the trolley 1, said frame 13 comprising upper and lower horizontal rails 14, 15 respectively, interconnected by end pillars 16. On the lower end of each of these end pillars 16 is swively or pivotally connected the inner end of a rigid arm 17 which slopes upwardly from its swivel or pivot 18 so as to bring the outer end of the arm 17 to approximately the same level or even higher than the upper rail 14 of the frame 13 carried by the central post 4 of the trolley 1. On the outer end of each arm 17 is mounted a pneumatic pulsator 19 to which is connected by milk and suction pipelines 20 a teat-cup cluster 21 which is adapted to be suspended when not in use from a hook 22 provided near the outer end of the arm 17. A rod or wire stay 23 extends between the outer end of the arm 17 and the upper end of the pillar 16 on the lower end of which said arm is swively or pivotally mounted, the said arm 17, pillar 16 and stay 23 forming the sides of a triangle. In order to conserve space and to afford rigidity to the swivelling or pivoting arms 17 when the machine is stowed or while it is travelling each arm 17 with its stay 23 may be swung round in relation to the pillar 16 so as to lie flatly alongside of the frame 13.

On the lower rail 15 of the frame 13 are mounted two weighing appliances 24 having large vertically disposed indicating dials, one weighing appliance in each of the halves of the frame opening which is bisected by the upper end of the central post 4, the dials lying in or parallel to the plane of the frame 13. A milk receiver 25 is suspended from each weighing appliance 24 and receives milk from the teat cup cluster 21 via the pulsator 19 through a flexible pipeline 26 extending alongside of and carried by the adjacent arm 17. Milk from the receiver can flow by gravity with or without the aid of vacuum into a milk can 27 placed on one end of the platform 5 below the milk receiver 25. Each teat cup cluster 21 and its pulsator 19 are preferably connected to a source of vacuum, via the interiors of the arms and of the associated pillar, which are of tubular form through flexible conduits 28, or rigid conduits, extending from the pillar 16 to the central post 4, also of tubular form and thence through a trailing pipeline 4A adapted for temporary connection in any suitable manner to a suction main installed in the cow house, or to vacuum-producing equipment which may be mounted on the trolley 1. The milk receivers 25 are also placed under suction by pipelines 30 which extend between the covers of the receivers and the hollow central post 4; the suction applied to the pipelines 30 can be cut off or regulated by a vacuum control tap 130. The transfer of milk from the milk receivers 25 to the milk cans 27 is effected through flexible nozzles 31 connected to detachable can heads 27A, said nozzles 31 being provided with cut-off valves 32. Tap-controlled pipelines 30A connect the hollow post 4 to can heads 27A to place the milk cans 27 under vacuum.

The pulsators 19 are provided with nozzles 191 to which by-pass connections 192, can be attached during a teat-cup cleaning operation.

The central location of the post which carries the arm-supporting frame provides a well-balanced stable machine, so that the machine can be readily propelled by hand. Moreover the height at which each radial arm is supported makes it possible for a milk-yield weighing appliance with a large, vertically-disposed indicating dial and a milk receiver suspended therebelow to be mounted vertically above a milk can placed on the trolley platform so that the milk can flow by gravity from the milk receiver directly into the can. This arrangement leads to a further advantage, namely, that two milk cans can be carried one on each end of the trolley platform in fore-and-aft alignment, with the central frame-supporting post between the two churns and with one of the associated milk receivers and weighing instruments above the front can and the other receiver and weighing instrument above the rear can. In this manner width of the trolley can be kept to a minimum consistent with stability.

I claim:

1. A transportable pneumatic milking machine comprising a wheeled trolley having a low-level platform; an upright post mounted on said platform in a substantially central position, a frame mounted on said post and lying substantially in a fore-and-aft plane, said frame having parallel vertical end pillars; two arms swingably mounted one about the axis of each of said frame pillars for swinging in a substantially horizontal plane between extended working positions and out-of-use positions in which the two arms lie along opposite sides of said frame and point in opposite directions; at least one teat cup cluster and pulsator assembly suspended from the outer end of each arm; a milk receiver operatively associated with each teat cup cluster and pulsator assembly and suspended from the frame which supports said radial arms, to receive milk drawn from the teat cups, and deliver it to a milk can placed on said platform; and a milk-yield indicating appliance mounted on said frame and connected to each milk receiver for indicating the yield of milk drawn by the associated teat-cup cluster and delivered into the milk receiver, each radial arm being swingable at a height above ground level which allows the teat-cup clusters, when suspended on the outer ends of the radial arms in out-of-use positions, to pass over the back of a standing cow.

2. A milking machine according to claim 1, wherein space is provided on the platform for two milk cans, one before and one behind the central post.

References Cited in the file of this patent

UNITED STATES PATENTS

| Number | Name | Date |
|---|---|---|
| 1,221,483 | Sharples | Apr. 3, 1917 |
| 1,377,244 | Tanner | May 10, 1921 |
| 1,494,138 | Shippert et al. | May 13, 1924 |
| 1,536,634 | Shippert et al. | May 5, 1925 |
| 1,910,830 | Hapgood | May 23, 1933 |
| 2,287,506 | Anderson | June 23, 1942 |
| 2,292,849 | Schmitt | Aug. 11, 1942 |
| 2,595,539 | Redman, Jr. | May 6, 1952 |
| 2,608,951 | Kingston | Sept. 2, 1952 |